United States Patent [19]
Tolchin et al.

[11] Patent Number: 5,370,042
[45] Date of Patent: Dec. 6, 1994

[54] CONTAINER FOR COOKING FOODS

[76] Inventors: Norman Tolchin; Carole J. Tolchin, both of 7225 Windcrest La., North Richland Hills, Tex. 76180

[21] Appl. No.: 200,926

[22] Filed: Feb. 22, 1994

Related U.S. Application Data

[63] Continuation of Ser. No. 786,530, Nov. 1, 1991, abandoned.

[51] Int. Cl.$^5$ ............................................. H05B 6/64
[52] U.S. Cl. .................... 99/417; 99/DIG. 14; 99/451; 219/731; 219/734
[58] Field of Search ............... 99/417, 451, DIG. 14, 99/410, DIG. 15; 219/10.55 E, 10.55 F, 10.55 R, 10.55 D; 426/241, 243; 220/912; 126/369

[56] References Cited

U.S. PATENT DOCUMENTS

| | | | |
|---|---|---|---|
| 1,319,878 | 10/1919 | Lewis | 220/912 |
| 2,745,642 | 5/1956 | Hermann | 366/130 |
| 4,317,017 | 2/1982 | Bowen | 99/450 |
| 4,413,167 | 11/1983 | Martel et al. | 99/451 |
| 4,486,640 | 12/1984 | Bowen et al. | 99/451 |
| 4,560,850 | 12/1985 | Levendusky et al. | 219/10.55 E |
| 4,663,506 | 5/1987 | Bowen et al. | 219/10.55 E |
| 4,705,927 | 11/1987 | Levendusky et al. | 99/DIG. 14 |
| 4,839,484 | 6/1989 | Senba | 426/243 |
| 4,853,509 | 8/1989 | Murakami | 99/DIG. 14 |

Primary Examiner—David A. Scherbel
Assistant Examiner—Patrick F. Brinson
Attorney, Agent, or Firm—Lyon & Lyon

[57] ABSTRACT

Disclosed herein is a specially designed container for cooking foods. In a preferred embodiment, the container has a centrally located segregated receptacle for containing a liquid. Upon heating, steam is formed from the liquid in the receptacle and circulates throughout a chamber wherein the food is contained. The combination of circulating steam and microwave energy yields reduced cooking times for many foods and preserves the aesthetic qualities of food cooked in the container disclosed herein.

18 Claims, 2 Drawing Sheets

CONTAINER FOR COOKING FOODS

This is a continuation of co-pending application Ser. No. 07/786,530, filed on Nov. 1, 1991 and which designated the U.S. now abandoned.

This invention relates to the field of specially designed containers for cooking food. The container that is the subject matter of the invention provides for an improved use of steam energy, preferably in conjunction with microwave energy, to cook foods with desirable aesthetic results. When used in a microwave oven, the special design of the container also overcomes some of the problems traditionally associated with microwave cooking.

BACKGROUND

Many foods are cooked in the presence of added water or moisture generated by components of the food itself. In conventional cooking, such foods may simply be placed in a container with a cover that is capable of restricting or eliminating the loss of moisture from the food as it is cooked. Other foods may be completely submersed in water for the duration of the required cooking time, after which the water is removed and the food served.

For certain foods, specially designed cooking containers known as "steamers" cook food by heating water to produce steam that is then brought into contact with the food to achieve the cooking process. Long before microwave cooking was developed, cooking with steam was a technique that was widely practiced. Steam cooking offers several advantages, aesthetic and otherwise, in preparing certain foods. For many foods, vegetables in particular, steam cooking is a favored cooking method for preserving the food's texture, color, taste, and nutritional value. The steam is produced by heating a quantity of water to or near its boiling point and allowing the steam to circulate within an enclosed space.

Foods cooked in steam tend to retain water-soluble vitamins and minerals that may be lost if the food were boiled in a quantity of water that is discarded after cooking. Moreover, certain steam-cooked foods retain their color and texture, making the food more aesthetically pleasing than the same food cooked by a different method. Additionally, when food is cooked with steam, the potential for burning the food is reduced because the steam moderates the heat, and the moisture prevents food from becoming dried.

Microwave cooking, since its inception, has become increasingly popular because of economy of time, effort, and energy. However, because microwave ovens cook with transmitted energy rather than through conduction or convection of heat energy, certain problems unique to microwave cooking have arisen. For example, certain substances accumulate heat and cook faster than others, leading to hot and cold spots in food. Microwave ovens are notorious for not distributing microwave energy in a uniform or predictable fashion. Also, certain foods are not aesthetically pleasing when cooked in a microwave oven for a variety of reasons. Additionally, loss of moisture during the cooking process causes many foods to obtain an unpleasant texture.

Despite the known problems, microwave ovens are widely used for reheating, and to a lesser extent, for cooking of many foods. Through trial and error most people develop preferred methods for cooking particular foods based on the aesthetic considerations associated with particular foods and individual tastes. For a few foods, special cooking containers have been developed. Some of these containers attempt to mimic the effect of a grill or griddle, others, such as microwave-compatible bags of popcorn, are simply containers that are conveniently used with certain types of food as dictated by the physical characteristics of the food and the method of cooking that yields desirable aesthetic effects for a particular food.

Although special microwave cooking containers may achieve desirable results for a particular food, the design of many of these containers is suitable for use only with those foods. For example, U.S. Pat. No. 4,280,032 describes an apparatus having an outer container containing a water chamber in which is placed an inner container, preferably composed of microwave-energy impermeable drawn aluminum, containing an egg. This design is chosen to address certain problems inherent in cooking eggs because an egg has unique physical properties that are problematic when microwave energy is used for cooking.

Another example of a container specially designed for the characteristics of a single food is U.S. Pat. No. 4,853,509. This container is specially designed to allow a user to boil and steam rice in a desired shape without the necessity of handling a quantity of the hot rice to press it into a desired shape.

With the advent of microwave cooking, a number of containers have been developed that attempt to overcome the problem of uneven heating that occurs in conventional microwave ovens. Uneven cooking, resulting in hot and cold spots, is a problem experienced by most, if not all, persons who cook with a microwave oven. Attempts to combat uneven heating have involved rotating the food, either manually, which requires interrupting the cooking cycle, or on a rotating platter installed in the microwave oven.

In the attempt to overcome the uneven cooking problem, some approaches recognize the difficulty in heating a large single mass of food and provide a container that exposes the food to a more uniform flux of microwave energy. For example, U.S. Pat. No. 4,416,906 describes a disposable microwave shipping and cooking package that packs the food around a central core composed of microwave transparent material in an attempt to encourage complete heating of the innermost parts of the food mass. The physical configuration of the package and the orientation of the pre-packaged food appears to offer the advantage of allowing microwave penetration and heating of the food from the direction of the inner core. Microwave energy does not penetrate the sides of the container, and the heating of the food appears to begin at the innermost portion of the food mass and proceeds outward.

Many books that instruct in microwave cooking techniques advise that vegetables and such foods that may freely contact water should be cooked in a shallow container with the food partially submerged in water. This approach is an attempt to preserve the moisture content of the food, especially on the foods exterior surface and to use the liquid medium to promote more uniform heating. However, this method is similar to traditional boiling and adversely effects the aesthetic qualities, especially texture and to a lesser extent, color, of many foods and may cause loss of certain water-soluble vitamins. As an alternate approach, containers have been developed that allow the food to rest on ridges or other supports above the level of water added to the container. Moisture rising from beneath the food helps prevent excessive moisture loss from the food while the cooking is achieved by the microwave energy.

Another approach used in the design of microwave cooking containers is the use of materials that partially or totally shield the enclosed food from microwave energy. It is believed that these designs reflect attempts to mimic traditional cooking methods in microwave ovens. U.S. Pat. No. 4,317,017 describes an adapted steaming apparatus that shields food from microwave energy but features a microwave transparent water containment chamber beneath the food containment chamber. Water is placed in the dish portion and, as heating by microwave energy occurs, steam rises through openings in the bottom of the food containment chamber. In this apparatus, heating of the food is caused solely by steam rising into the food containment chamber. Although this design appears to create and contain steam, certain foods are unsuitable for cooking by steam alone, and this device is not designed to allow penetration of microwave energy. Moreover, there is no means to encourage thorough circulation of the steam. A design of this type requires that the food rest above a reservoir of water and necessitates use of an internal container, grate, or shelf to keep the food out of the water reservoir.

U.S. Pat. No. 4,705,927 describes a device where water is placed in a microwave permeable container beneath the food containment chamber. The steam generated heats the bottom of the food containment chamber which in turn conducts heat to the food as in conventional cooking. Additional cooking is achieved by exposure to microwave radiation through the top of the container. Steam is not circulated in the food-containing compartment used to promote more thorough heating via heat conducted to the food containment chamber by steam created in the water chamber.

SUMMARY OF INVENTION

The present invention provides a novel apparatus that preserves the aesthetic quality of food and reduces cooking time by the simultaneous use of steam and microwave energy. By placing a segregated receptacle capable of containing a liquid within a substantially sealed food containment chamber, steam and microwave energy operate simultaneously on the food to decrease the required cooking time, preserve and enhance the aesthetic quality of the food, and eliminate the problem of inconsistent heating. The configuration of the container is such that circulation of steam currents throughout the cooking chamber is enhanced. This unique configuration offers many advantages, including simplicity and ease of cleaning, water savings, and excellent aesthetic qualities of the food as compared to other cooking methods.

Although the container may be used in conventional, i.e., non-microwave cooking with excellent results, the advantages derived from this invention compared to other containers and techniques are most dramatic when used in a microwave oven. For this reason, many of the characteristics of the invention are described to take advantage of microwave cooking although circumstances could obviously dictate the use of a particular embodiment only in a particular environment. For example, the container described herein may be made of any substance suitable for containing heated food. For microwave use, a ceramic, plastic, or other microwave permeable substance is required. A ceramic construction could be used in a conventional oven in an identical manner to a microwave oven, while a plastic version, which may be desirable because it would be less breakable, would normally only be used in a microwave oven. In a particularly preferred embodiment, the container described herein is made of ceramic or other heat retaining material in which the circulating steam and microwave energy also warm the container, which in turn keeps the food warm throughout serving.

This invention is comprised of two parts: a top component and a bottom component, both preferably made of microwave-transparent material. The bottom component may be flat, bowl-shaped or in any configuration that is suitable for holding food during cooking, re-heating, serving, and eating. The bottom portion features a segregated receptacle designed to contain a small amount of water sufficient to create steam throughout the entire cooking process without excessive waste of water. It is believed that, as steam is generated from the heated water in the segregated receptacle, the steam travels radially outward from the receptacle. Being contained by the shape of the lid, as the steam circulates it is heated by microwave energy and is directed by the walls and top of the container into contact with the food. In a preferred embodiment, the container is circular with the receptacle located substantially in the center of the food containment compartment. This embodiment has been discovered to maximize the advantages offered by the container that is the subject matter of this invention because food in this configuration is rapidly and evenly cooked by being thoroughly and uniformly exposed to microwave and steam energy.

The top component is a lid that inhibits the escape of steam and directs the steam back to the food. When the cooking is complete, the lid may be left in place to prevent heat from escaping. The top component may comprise a substantially flat or partially concave lid for a bowl-shaped bottom component or may comprise a dome-shaped structure that includes the side walls of the container, if the bottom component is substantially planar. In either embodiment, the top and bottom component together form a singly closed container surrounding the segregated receptacle so that steam can circulate throughout the food.

Additionally, certain foods such as rice that are cooked while submerged in liquid may also be advantageously cooked using this invention although the benefits from circulating steam and simultaneous microwave energy may not be exhibited. In such an application, some advantage in reducing cooking time may be observed by virtue of the orientation of the food in a circular configuration so that maximum exposure to microwave energy is obtained.

Generally, a concave side wall, forming the outside of the food containment chamber, a concave top component, and a centrally located segregated receptacle, are preferred because these configurations are believed to encourage more thorough circulation of the heated steam currents. However, depending on the materials from which the container is manufactured, and the selection of the size and shape of the exterior of the container, the shape of the walls and location of the segregated receptacle could be altered to suit a particular application without diverging from the principles of this invention and without losing the advantages offered by this invention.

It is believed that simultaneous heating of the food mass caused by circulating steam currents and microwave energy is primarily the cause of the decreased cooking times that have been observed with this invention.

This container also economizes the users time and energy in both serving and cleanup compared to other packages or containers, which require more component parts to assemble and clean and usually, an additional serving container. Water is economized both in the amount required for cooking as compared to conventional stove-top steaming, and in the amount required for cleaning as compared to most other containers.

BRIEF DESCRIPTION OF THE DRAWINGS

The invention will be more readily understood by reference to the accompanying drawings, in which.

FIG. 2 also shows a top component of an appropriate size to fit the bottom portion in the embodiment illustrated in FIGS. 1 and 2 and shows by cut-away view, the concavity of the top component shown in this embodiment.

DETAILED DESCRIPTION OF THE INVENTION

Figure 1:
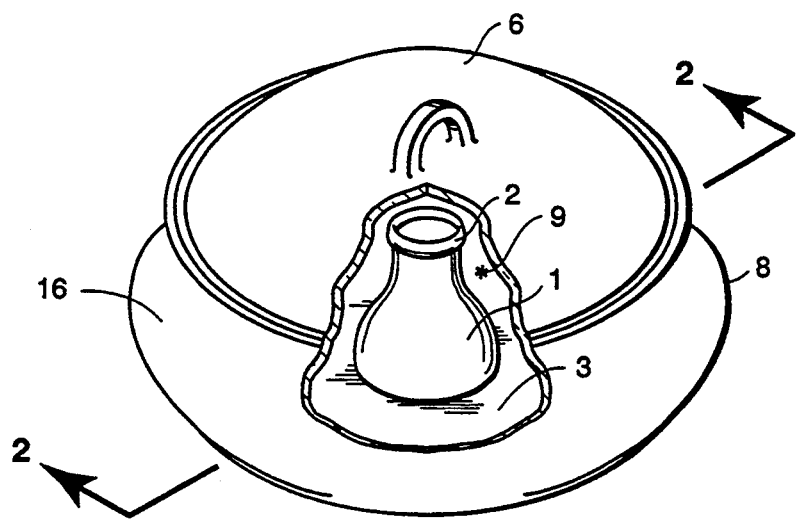
FIG. 1 illustrates a perspective view of a preferred embodiment of the present invention showing a circular configuration for the food containment chamber and a centrally located segregated receptacle for liquid, including a cut-away portion to reveal the interior of the container and a preferred location of the segregated receptacle.
Figure 2:
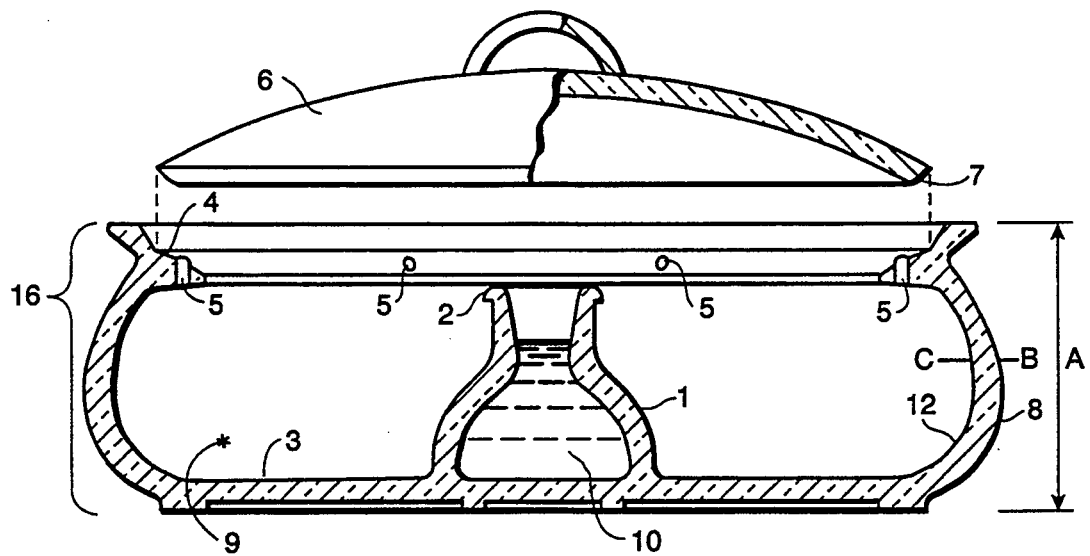
FIG. 2 illustrates a cross-sectional view along line 2—2 of FIG. 1 of a preferred embodiment showing the internal volume of the segregated receptacle and a possible choice for placement of the receptacle within the food containment chamber.

Referring to all the Figures, in preferred embodiments, a segregated receptacle 1 is located in the center of the bottom component 16 and contains a quantity of water 10 (FIG. 2). An outer wall 8 surrounds a food containment chamber 9 in which the segregated receptacle 1 is located. An annular-shaped food containment chamber 9 is preferred because it enables easy input and removal of food without excessive spilling into the height of the segregated receptacle 1. In the embodiment illustrated in FIGS. 1, 2, and 3, the segregated receptacle 1 substantially approaches the height of the outer wall 8 of the food containment chamber 9, but should not abut the top component 6, allowing steam to flow from the neck 2 of segregated receptacle 1 into the food containment chamber 9 without interference. A clearance of approximately ½ to 2 inches from the neck 2 of segregated receptacle 1 to the bottom of the top component 6 is preferred but may vary according to the size and configuration of the container.

Figure 3A:
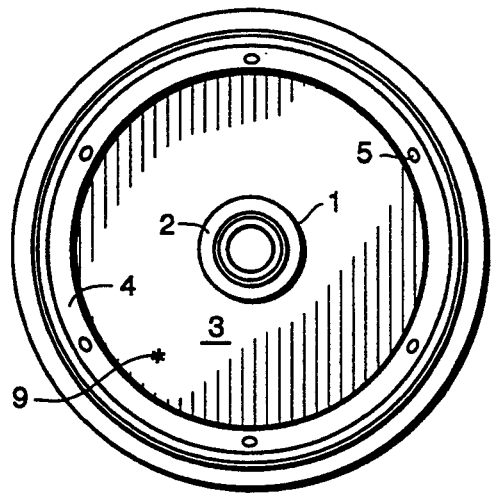
FIG. 3A shows a top view of a preferred embodiment of the present invention showing the interior of the bottom component and the entire circumference of the edge upon which the top component rests. In this embodiment, circular passages are shown that pass through the entire thickness of the edge, passing completely from the upper surface of the edge upon which the top component rests, to the food containment chamber.

Referring to FIG. 2 and the embodiment illustrated there, the top component 6 is slightly inset from the outer wall 8 of the bottom portion of the container such that the outer rim 7 of the top component 6 rests on the edge 4 of the outer wall 8. In a preferred embodiment, a plurality of passages 5 are placed in edge 4 that pass through the entire thickness of edge 4. If liquid water or liquid food derivatives accumulate around the circumference of the container during the cooking process, the liquid flows down through passage 5 into the food containment compartment 9. Additionally, the passages 5 in edge 4 minimize overflow of liquid that may occur when cooking food with a very high moisture content or when water is added directly to food containment chamber 9 prior to cooking. A plurality of passages 5 are most effective at returning accumulated liquid to the food containment chamber when evenly spaced around substantially the entire circumference of edge 4 as illustrated in FIG. 3A.

Figure 3C:
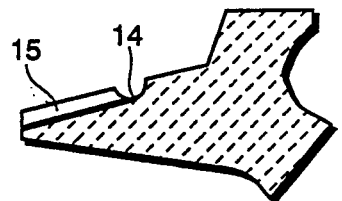
FIG. 3C is a cross-sectional view of the edge of the container along line 3C—3C of FIG. 3B showing a preferred placement of the channels to facilitate ease of flow of accumulated liquids.
Figure 3B:
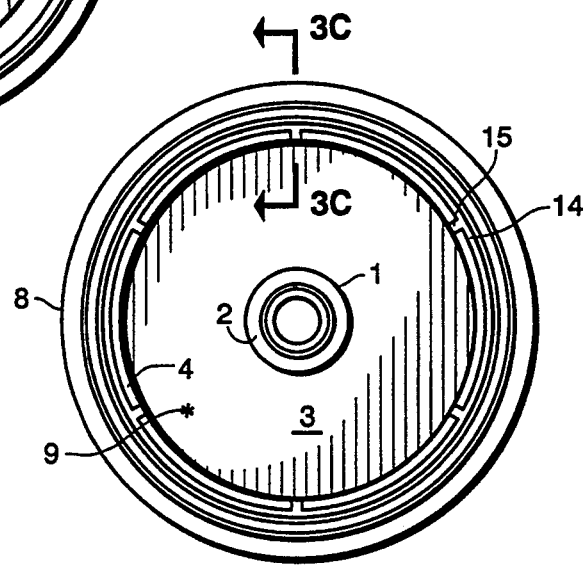
FIG. 3B illustrates an embodiment where channels are placed in the edge so that liquid that accumulates around the edge is allowed to flow back into the food containment chamber.

Referring to FIGS. 3B and 3C, an alternative to passages 5 is at least one channel 14 that is placed in edge 4 around it periphery through which accumulated liquid may flow back into food containment chamber 9. Ease of flow from channel 14 into food containment chamber 9 may be facilitated by one or more short channels 15 running from channel 14 to the innermost ledge of edge 4.

Food is placed in food containment chamber 9 to rest on bottom surface 3 between the segregated receptacle 1 and inner wall 12 and is distributed evenly to promote maximum exposure to steam, generated by heated water 10, flowing radially outward from the neck 2 of the segregated receptacle 1 and for maximum exposure to the microwave energy entering the food containment chamber 9 through top component 6 and outer wall 8. An even placement of food around food containment chamber 9 also promotes the thorough and even distribution and flow of the heated steam currents.

Figure 4:
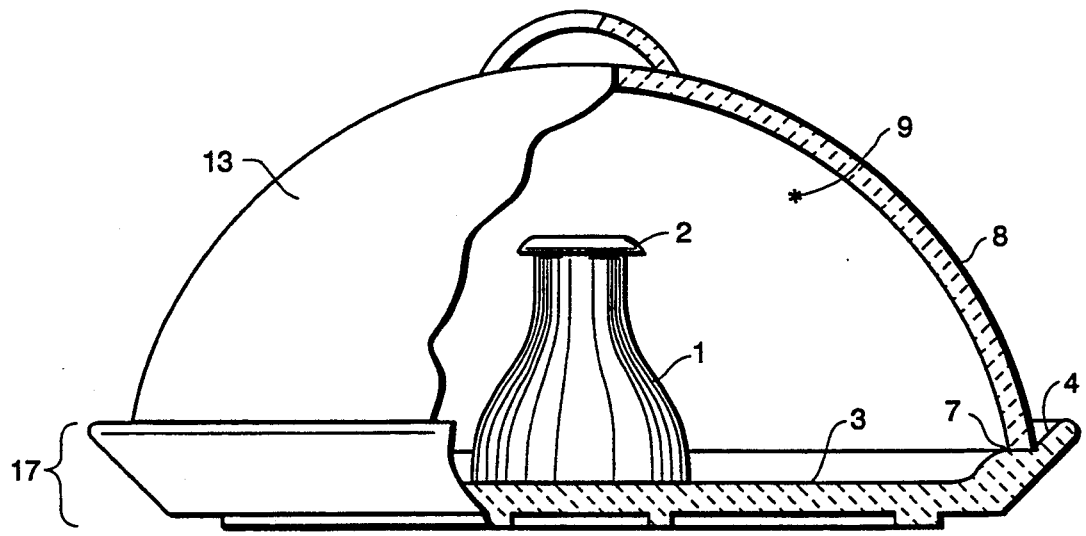
FIG. 4 illustrates an alternative embodiment where the bottom component is substantially flat or plate-shaped, containing a segregated receptacle, and is covered by a top component comprising a dome-shaped lid that covers the bottom component to enclose the segregated receptacle and the food containment chamber.

Referring to FIG. 4, this embodiment has a differently configured top component 13 and bottom component 17 that may be more suitable for advantageously heating smaller quantities of food. In this embodiment, a portion of food is placed on the bottom surface 3 of the bottom component 17 surrounding the segregated receptacle 1 as in the above embodiment. Unlike the embodiment shown in FIGS. 1, 2, and 3, the outer wall 8 of the food containment chamber 9 is incorporated into the top component 13. The top component 13 is dome-shaped, thus comprising the outer wall 8 that surrounds the food containment chamber 9 and covers the segregated receptacle 1. All other elements are essentially similar although the configuration of the junction of the rim 7 of the top component 13 and the edge 4 of the bottom component 17 may differ slightly to achieve a stable juncture.

EXAMPLE

The following example is representative of one possible configuration of a preferred embodiment of the container described herein. The dimensions given below are not limiting in any fashion, but are representative of one individual container used in the testing and development of this invention. The container described in this example is circular and essentially similar to the embodiment shown in FIGS. 1, 2, and 3A. The outer wall 8 is approximately 3.5 inches high (A). The inner wall 12 is concave, thus forming a bowl-shaped bottom component 16. The outer diameter of the bottom component 16 at its greatest distance, measured at a point (B) on outer wall 8 approximately 1.75 inches above the bottom surface 3, is about 11.5 inches. The inner diameter of the food containment chamber 9, at its outer periphery measured at a point (C) on inner wall 12 approximately 1.75 inches above the bottom surface 3, is approximately 11 inches. The segregated receptacle has a height of approximately 3.0 inches above bottom surface 3 and is capable of containing about 50–100 ml of water.

The edge 4 is approximately 0.75 inches wide and has six passages 5 that run from the upper surface of the edge 4, through the edge 4 into the food containment chamber 9. Each passage 5 is approximately 0.125–0.25 inches in diameter. The top component 6 is circular and slightly concave and has a diameter of approximately 9.5 inches.

During development and testing of the invention, substantially reduced cooking times have been observed as compared with traditional cooking techniques. The following Table lists the results of cooking experiments conducted with an embodiment of the invention described herein which is termed the "Microwave Steamer" in the Table below. Several common foods were cooked with different containers under different cooking conditions. The cooking times reflect the inventors' best efforts to apply a uniform standard for fairly judging, from method to method, when the cooking of the particular food was complete. The individual food was subjectively determined to have completed cooking by testing with a fork to assess texture. Thus, the recorded times are the times required by each method to achieve a satisfactory texture for the particular food. To illustrate the effect of simultaneous steam and microwave cooking in the container that is the subject of this invention, Method 2 uses the same embodiment of the present invention as is used in Method 1 except that water is not added to the segregated receptacle before cooking.

MICROWAVE STEAMER COOKING TEST

Method No. 1=Microwave Steamer in a standard domestic microwave oven with 25 ml. water added to the segregated receptacle.
Method No. 2=Microwave Steamer in a standard domestic microwave oven without added water.
Method No. 3=Corning Ware ® brand container in standard domestic microwave oven (2.5 qt. container with lid, plus 250 ml. water).
Method No. 4=Conventional stove top steaming in 2.5 qt. stainless steel pan with lid and inner basket plus 250 ml. water.

| TIME REQUIRED TO COMPLETE COOKING | | | | |
| --- | --- | --- | --- | --- |
| FOOD | Method No. 1 | Method No. 2 | Method No. 3 | Method No. 4 |
| Fresh BROCCOLI 179.5 grams | 5 mins. | 6 mins. | 9.5 mins. | 12.5 mins. |

| TIME REQUIRED TO COMPLETE COOKING | | | | |
| --- | --- | --- | --- | --- |
| FOOD | Method No. 1 | Method No. 2 | Method No. 3 | Method No. 4 |
| Method No. 1 exhibits cooking times reduced by 60% compared to Method No. 4, by 47% compared to Method No. 3, and 17% compared to Method No. 2. | | | | |
| Fresh CAULIFLOWER 148 grams | 4 mins. | 5 mins. | 6 mins. | 8 mins. |
| Method No. 1 exhibits cooking times reduced by 50% compared to Method No. 4, by 33% compared to Method No. 3, and 20% compared to Method No. 2. | | | | |
| Fresh CARROTS 213 grams | 7.5 mins. | 8 mins. | 11 mins. | 28.5 mins. |
| Method No. 1 exhibits cooking times reduced by 74% compared to Method No. 4, by 32% compared to Method No. 3, and 6% compared to Method No. 2. | | | | |
| Fresh POTATOES 520 grams | 8.5 mins. | 10 mins. | 12 mins. | 13 mins. |
| Method No. 1 exhibits cooking times reduced by 35% compared to Method No. 4, by 29% compared to Method No. 3, and 15% compared to Method No. 2. | | | | |

NOTES:
1. All cooking containers, microwave, and burners were cooled to room temperature between each test.
2. All tests were accomplished with containers in middle of microwave or middle of stove top burner.
3. The microwave wattage for Methods 1–3 was 700, the cooking intensity was set on maximum. (Hotpoint ®, Countertop Saver, Model #R VM120 001).
4. The stove top range used in Method 4 is electric and cooking was achieved using conventional stove-top steaming techniques. Initially, the setting was on maximum until vigorous boiling was achieved after which the heat was reduced to approximately one third of maximum to maintain simmering heat. (Roper ®, Model No. 2384).
5. Appropriately sized lids were used on all containers.
6. The stainless steel pan was a top quality "waterless cookware" container manufactured by Seal-O-Matic ®. The manufacturer of this container claims that the sealed design of this container results in reduced cooking times compared to other cookware.
7. The Corning Ware ® container was square-shaped with a matching glass lid.

It is to be emphasized that the terms and descriptions used herein are preferred embodiments set forth by way of illustration only, and are not intended as limitations on the many variations which those of ordinary skill in the art will recognize to be possible in practicing the invention. Modifications and other uses will occur to those skilled in the art which are encompassed within the spirit of the invention or defined by the scope of the following claims.

We claim:
1. A container for cooking foods that is capable of being used in a microwave oven comprising:
a substantially circular bottom component comprising a flat bottom surface and a concave wall defining an annular chamber for containing food and a segregated receptacle for containing a quantity of liquid that is vaporized by exposure to microwave energy, said bottom component having an edge at the uppermost portion of the wall to receive a top component;

the top component comprising a partially concave lid for covering the food containment chamber and for containing steam in the bottom component; and said segregated receptacle located substantially in the center of the food containment chamber and having an opening at the top thereof from which steam flows, and having a height substantially approaching the height of the wall.

2. A container formed of non-microwave reactive material for cooking foods comprising:

a bowl-shaped bottom component comprising a bottom surface upon which food may be placed and a wall, the bottom surface and the wall defining an annular food containment chamber, and a segregated receptacle for containing a quantity of liquid to be heated for generating steam and which has a height substantially approaching the height of the wall;

an edge at the uppermost portion of the wall around substantially the entire periphery of the food containment chamber for receiving a substantially planar top component;

said top component comprising a lid for covering the food containment chamber, the periphery of the top component being shaped to fit conformingly on the edge, the top component and the bottom component forming a singly closed container that contains steam in contact with food in the food containment chamber.

3. The container of claim 2 wherein the food containment chamber is substantially circular and surrounds the segregated receptacle.

4. The container of claim 2 wherein the segregated receptacle is located substantially in the center of the food containment chamber.

5. The container of claim 2 wherein the top component is shaped to direct steam into contact with the food contained in the food containment chamber.

6. The container of claim 2 wherein at least one component of the container is made of a ceramic material.

7. The container of claim 2 wherein at least one component is made of a plastic material.

8. The container of claim 2 wherein at least one component is made of a glass material.

9. The container of claim 2 wherein the edge contains a plurality of passages that traverse the width of the edge.

10. The container of claim 2 wherein the clearance between the top component and the segregated receptacle is approximately one-half to two inches.

11. A container for cooking foods comprising:

a dome-shaped top component that contacts a bottom component about a periphery of said bottom component to form a single substantially enclosed food containment chamber capable of containing steam therein and permitting said steam to circulate in the food containment chamber, said bottom component comprising a substantially flat bottom surface and a segregated receptacle for containing a quantity of liquid to be heated to generate steam, said segregated receptacle maintaining said quantity of liquid separate from food placed in the food containment chamber.

12. The container of claim 11 wherein at least one component is made of a ceramic material.

13. The container of claim 11 wherein at least one component is made of a plastic material.

14. The container of claims 11 wherein the means for containing a quantity of liquid is a segregated receptacle.

15. A process for cooking food by microwave and steam energy comprising the steps of:

placing food in a food containment chamber surrounding a segregated receptacle;

adding liquid to the segregated receptacle to contain said liquid separate from the food;

covering the food containment chamber with a top component to fit conformingly upon a bottom component to form a singly enclosed container capable of containing steam;

exposing the container to microwave energy to generate steam from the liquid contained in the segregated receptacle, allowing said steam to emanate from the segregated receptacle to contact the food in the food containment chamber; and heating the food by simultaneous exposure to microwave energy and heated steam currents.

16. The process of claim 15 wherein the food is oriented in a circular configuration in the food containment chamber.

17. The process of claim 15 wherein the liquid added to the segregated receptacle is water.

18. A process for cooking food comprising the steps of:

placing food in a food containment chamber surrounding a segregated receptacle;

adding liquid to the segregated receptacle to contain said liquid separate from the food;

covering the food containment chamber with a top component to fit conformingly upon the bottom component to form a singly enclosed container capable of containing steam;

exposing the container to heat to generate steam from the liquid contained in the segregated receptacle, allowing said steam to emanate from the segregated receptacle to contact the food in the food containment chamber; and heating the food by exposure to heat and steam currents.

* * * * *